(12) United States Patent
Fu et al.

(10) Patent No.: US 12,711,058 B2
(45) Date of Patent: Aug. 18, 2026

(54) MEMORY SYSTEM, OPERATION METHOD THEREOF, ELECTRONIC APPARATUS, AND COMPUTER READABLE STORAGE MEDIUM

(71) Applicant: YANGTZE MEMORY TECHNOLOGIES CO., LTD., Wuhan (CN)

(72) Inventors: Hai Fu, Wuhan (CN); Hongbo Wang, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 247 days.

(21) Appl. No.: 18/597,067

(22) Filed: Mar. 6, 2024

(65) Prior Publication Data

US 2025/0123961 A1 Apr. 17, 2025

(30) Foreign Application Priority Data

Oct. 17, 2023 (CN) ......................... 202311352729.0

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ..................... G06F 12/0246; G06F 2212/7201
See application file for complete search history.

(56) References Cited

U.S. PATENT DOCUMENTS

2020/0026663 A1* 1/2020 Xu ...................... G06F 12/0868
2020/0327063 A1* 10/2020 Kang ................. G06F 12/0871
2020/0363965 A1* 11/2020 Lee ....................... G06F 3/0652
2023/0325110 A1* 10/2023 Jung ....................... G06F 3/061
711/154
2025/0044977 A1* 2/2025 Bhoopali ................ G06F 3/061
2025/0103482 A1* 3/2025 Neelannavar ....... G06F 12/0246

* cited by examiner

*Primary Examiner* — Prasith Thammavong
(74) *Attorney, Agent, or Firm* — Conley Rose, P.C.

(57) ABSTRACT

A memory system includes: a memory device and a memory controller coupled with the memory device, wherein the memory device includes a plurality of first subregions storing mapping data; the memory controller is coupled with a host; the host includes a plurality of second subregions corresponding to the plurality of first subregions; the mapping data includes a logical address to physical address mapping relationship; logical address ranges of mapping data stored in a first subregion and a second subregion corresponding to each other are the same; the memory controller is configured to: divide the first subregion into a plurality of data units; when mapping data in a data unit is changed, label the data unit; and based on the number of the labeled data units in the first subregion, determine whether to trigger an update of mapping data in the second subregion corresponding to the first subregion.

18 Claims, 10 Drawing Sheets

| FIRST SUBREGION | DATA UNIT 1 | 0 |
|---|---|---|
| | DATA UNIT 2 | 0 |
| | DATA UNIT 3 | 0 |
| | DATA UNIT 4 | 0 |
| | DATA UNIT 5 | 1 |
| | DATA UNIT 6 | 0 |
| | DATA UNIT 7 | 1 |
| | ....... | ....... |
| | DATA UNIT 32 | 0 |

FIG. 8

MEMORY SYSTEM, OPERATION METHOD THEREOF, ELECTRONIC APPARATUS, AND COMPUTER READABLE STORAGE MEDIUM

CROSS-REFERENCE TO RELATED APPLICATIONS

The present application claims priority to Chinese Patent Application No. 2023113527290, which was filed Oct. 17, 2023, is titled "MEMORY SYSTEM AND OPERATING METHOD, ELECTRONIC EQUIPMENT, COMPUTER-READABLE STORAGE MEDIUM," and is hereby incorporated herein by reference in its entirety.

TECHNICAL FIELD

The present disclosure relates to the technical field of semiconductors, and particularly to a memory system and an operation method thereof, an electronic apparatus, and a computer readable storage medium.

BACKGROUND

With the rapid development of data storage technologies, increasingly more data memory systems are present in electronic apparatuses used by people, e.g., a Secure Digital Memory Card (SD card), a Universal Flash Storage (UFS), Solid State Drives (SSDs), etc.

SUMMARY

Examples of the present disclosure provide a memory system and an operation method thereof, an electronic apparatus, and a computer readable storage medium, so as to solve at least one problem existing in the prior art.

The technical solutions of the examples of the present disclosure are achieved as follows:

In a first aspect, the examples of the present disclosure provide a memory system, comprising a memory device and a memory controller coupled with the memory device, wherein the memory device comprises a plurality of first subregions storing mapping data; the memory controller is coupled with a host; the host comprises a plurality of second subregions corresponding to the plurality of first subregions; the mapping data comprises a logical address to physical address mapping relationship; logical address ranges of mapping data stored in a first subregion and a second subregion corresponding to each other are the same; the memory controller is configured to:

- divide the first subregion into a plurality of data units;
- when mapping data in a data unit is changed, label the data unit; and
- based on the number of the labeled data units in the first subregion, determine whether to trigger an update of mapping data in the second subregion corresponding to the first subregion.

In an optional implementation, the memory controller is configured to:

- establish a bit map for the first subregion, with one bit in the bit map corresponding to one of the data units in the first subregion, so as to divide the first subregion into the plurality of data units; and
- when a physical address corresponding to at least one logical address in the data unit is changed, label a bit corresponding to the data unit in the bit map, so as to label the data unit.

In an optional implementation, the memory controller is configured to:

- when the number of the labeled data units in the first subregion is greater than or equal to an update threshold, determine to trigger the update of the mapping data in the second subregion corresponding to the first subregion; and
- when the number of the labeled data units in the first subregion is less than the update threshold, determine not to trigger the update of the mapping data in the second subregion corresponding to the first subregion.

In an optional implementation, the memory controller is further configured to:

- receive a read command packet;
- when the read command packet comprises the mapping data in the second subregion, acquire the number of the labeled data units in the first subregion corresponding to the second subregion; and
- in response to determination of triggering the update of the mapping data in the second subregion corresponding to the first subregion, send a message of recommending an update of the second subregion.

In an optional implementation, the memory controller is further configured to:

- when a logical address of the mapping data in the read command packet falls within a logical address range of the mapping data stored in the labeled data units, acquire a physical address corresponding to the logical address from the first subregion and performing a read operation; and
- when the logical address of the mapping data in the read command packet falls outside the logical address range of the mapping data stored in the labeled data units, perform a read operation based on a physical address in the read command packet.

In an optional implementation, the memory controller is further configured to:

- in response to determination of updating the mapping data in the second subregion, send the mapping data stored in the first subregion corresponding to the second subregion.

In an optional implementation, the number of the data units in the first subregion ranges from 8 to 1024; and a ratio of the update threshold to the number of the data units in the first subregion ranges from 25% to 75%.

In a second aspect, the examples of the present disclosure provide an operation method of a memory system, comprising:

- dividing a first subregion storing mapping data in a memory device into a plurality of data units;
- when mapping data in a data unit is changed, labeling the data unit, wherein the mapping data comprises a logical address to physical address mapping relationship; and
- based on the number of the labeled data units in the first subregion, determining whether to trigger an update of mapping data in a second subregion corresponding to the first subregion in a host, wherein logical address ranges of mapping data stored in the first subregion and the second subregion corresponding to each other are the same.

In an optional implementation, the dividing the first subregion storing the mapping data in the memory device into the plurality of data units and labeling the data unit comprise:

- establishing a bit map for the first subregion, with one bit in the bit map corresponding to one of the data units in the first subregion, so as to divide the first subregion into the plurality of data units; and when a physical address corresponding to at least one logical address in the data unit is changed, labeling a bit corresponding to the data unit in the bit map, so as to label the data unit.

In an optional implementation, the based on the number of the labeled data units in the first subregion, determining whether to trigger the update of the mapping data in the second subregion corresponding to the first subregion in the host comprises:

when the number of the labeled data units in the first subregion is greater than or equal to an update threshold, determining to trigger the update of the mapping data in the second subregion corresponding to the first subregion; and when the number of the labeled data units in the first subregion is less than the update threshold, determining not to trigger the update of the mapping data in the second subregion corresponding to the first subregion.

In an optional implementation, the operation method further comprises:

receiving a read command packet;

when the read command packet comprises the mapping data in the second subregion, acquiring the number of the labeled data units in the first subregion corresponding to the second subregion; and in response to determination of triggering the update of the mapping data in the second subregion corresponding to the first subregion, sending a message of recommending an update of the second subregion.

In an optional implementation, the operation method further comprises:

when a logical address of the mapping data in the read command packet falls within a logical address range of the mapping data stored in the labeled data units, acquiring a physical address corresponding to the logical address from the first subregion and performing a read operation; and when the logical address of the mapping data in the read command packet falls outside the logical address range of the mapping data stored in the labeled data units, performing a read operation based on a physical address in the read command packet.

In an optional implementation, the operation method further comprises:

in response to determination of updating the mapping data in the second subregion, sending the mapping data stored in the first subregion corresponding to the second subregion.

In a third aspect, the examples of the present disclosure provide an electronic apparatus, comprising a memory system and a host coupled with the memory system, wherein the memory system comprises a memory device and a memory controller coupled with the memory device; the memory device comprises a plurality of first subregions storing mapping data; the host comprises a host controller and a plurality of second subregions corresponding to the plurality of first subregions; the mapping data comprises a logical address to physical address mapping relationship; logical address ranges of mapping data stored in the first subregion and the second subregion corresponding to each other are the same; the memory controller is configured to:

divide the first subregion into a plurality of data units;

when mapping data in a data unit is changed, label the data unit;

based on the number of the labeled data units in the first subregion, determine whether to trigger an update of mapping data in the second subregion corresponding to the first subregion; and in response to determination of triggering the update of the mapping data in the second subregion corresponding to the first subregion, send a message of recommending an update of the second subregion;

the host controller is configured to:

receive the message of recommending the update of the second subregion, and determine whether to update the mapping data in the second subregion.

In an optional implementation, the memory controller is configured to:

establish a bit map for the first subregion, with one bit in the bit map corresponding to one of the data units in the first subregion, so as to divide the first subregion into the plurality of data units; and when a physical address corresponding to at least one logical address in the data unit is changed, label a bit corresponding to the data unit in the bit map, so as to label the data unit.

In an optional implementation, the memory controller is configured to:

when the number of the labeled data units in the first subregion is greater than or equal to an update threshold, determine to trigger the update of the mapping data in the second subregion corresponding to the first subregion; and when the number of the labeled data units in the first subregion is less than the update threshold, determine not to trigger the update of the mapping data in the second subregion corresponding to the first subregion.

In an optional implementation, the host controller is further configured to:

send a read command packet to the memory controller;

the memory controller is further configured to:

receive the read command packet, and when the read command packet comprises the mapping data in the second subregion, acquire the number of the labeled data units in the first subregion corresponding to the second subregion.

In an optional implementation, the memory controller is further configured to:

in response to determination of updating the mapping data in the second subregion by the host controller, send the mapping data stored in the first subregion corresponding to the second subregion;

the host controller is further configured to:

receive the mapping data stored in the first subregion, and update the mapping data in the second subregion corresponding to the first subregion.

In a fourth aspect, the examples of the present disclosure provide a computer readable storage medium storing a computer program which, when executed by a processor, implements the operation method of any one of the above implementations.

In the technical solutions provided by the examples of the present disclosure, the memory device of the memory system comprises the first subregions storing the mapping data, the host comprises the second subregions storing the mapping data, the first subregions are in one-to-one correspondence with the second subregions, and the logical address ranges of the mapping data stored in the first subregion and the second subregion corresponding to each other are the same. The memory controller may divide the first subregion into the plurality of data units by establishing the bit map, label validity of the mapping data in the bit map in units of the data units, and determine whether to trigger the update of the mapping data in the second subregion corresponding to the first subregion based on the number of the labeled data units. On the one hand, the memory controller may label the validity of the mapping data in units of smaller granularity. On the other hand, the memory controller may regulate an update frequency of the second subregion by setting the update threshold.

BRIEF DESCRIPTION OF THE DRAWINGS

FIG. 8 is a schematic diagram of a bit map provided by an example of the present disclosure;

DETAILED DESCRIPTION

Figure 1:
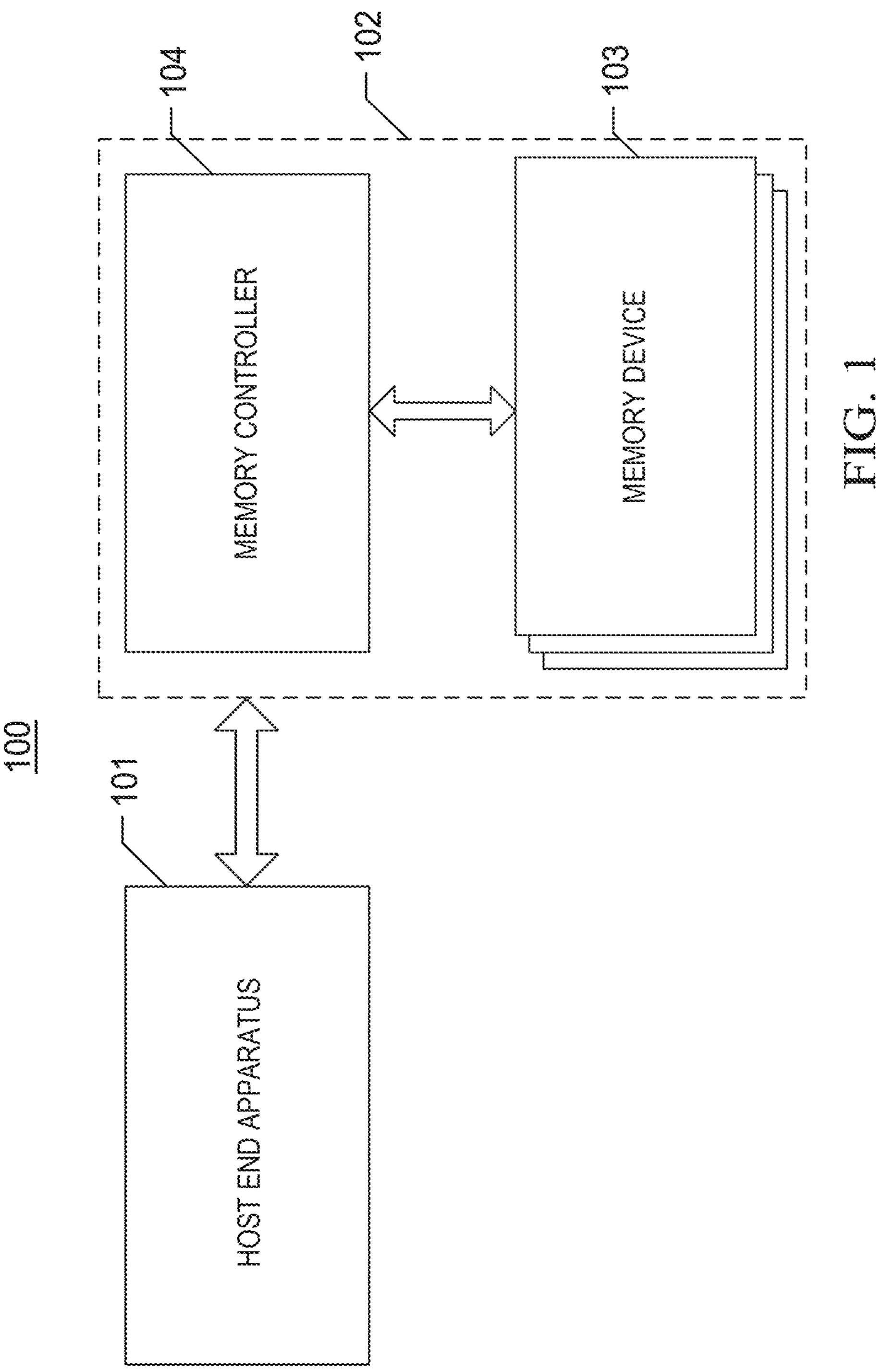
FIG. 1 is a schematic diagram of a system having a memory system provided by examples of the present disclosure.

Example implementations disclosed by the present disclosure will be described below in more details with reference to the drawings. Although the example implementations of the present disclosure are shown in the drawings, the present disclosure may be achieved in various forms which should not be limited by example implementations as set forth herein. Rather, these implementations are provided for a more thorough understanding of the present disclosure, and can fully convey the scope disclosed by the present disclosure to those skilled in the art.

In the following description, numerous example details are presented to provide a more thorough understanding of the present disclosure. However, it is apparent to those skilled in the art that the present disclosure may be practiced without one or more of these details. In other examples, in order to avoid confusing with the present disclosure, some technical features well-known in the art are not described; that is, not all features of actual examples are described herein, and well-known functions and structures are not described in detail.

In the drawings, like reference numerals denote like elements throughout the specification.

It should be understood that, spatially relative terms, such as "beneath", "below", "lower", "under", "over", "upper", and the like, may be used herein for ease of description to describe the relationship between one element or feature and other elements or features as illustrated in the figures. The spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may comprise both upper and lower orientations. The device may be orientated otherwise (rotated by 90 degrees or other orientations), and the spatially descriptive terms used herein are interpreted accordingly.

The terms used herein are only intended to describe the examples, and are not used as limitations of the present disclosure. As used herein, unless otherwise indicated expressly in the context, "a", "an" and "said/the" in a singular form are also intended to include a plural form. It is also to be understood that the terms "comprised of" and/or "comprise", when used in this specification, determine the presence of a feature, integer, step, operation, element and/or component, but do not preclude the presence or addition of one or more of other features, integers, steps, operations, elements, components, and/or groups. As used herein, the term "and/or" includes any and all combinations of the listed relevant items.

The memory system in the examples of the present disclosure include, but is not limited to, a memory system comprising a three-dimensional NAND memory. In order to facilitate the understanding, the memory system provided by the present disclosure is described by taking the memory system comprising the three-dimensional NAND memory as an example.

FIG. 1 is a schematic diagram of an example system having a memory system provided by examples of the present disclosure. In the examples of the present disclosure, the system 100 may be a mobile phone, a desktop computer, a laptop computer, a tablet computer, a vehicle computer, a game console, a printer, a pointing apparatus, a wearable electronic apparatus, a smart sensor, a Virtual Reality (VR) apparatus, an Augmented Reality (AR) apparatus or any other suitable electronic apparatuses having memories therein. As shown in FIG. 1, the system 100 may comprise a host end apparatus 101 and a memory system 102, and the memory system 102 may comprise one or more memory devices 103 and a memory controller 104. The host end apparatus 101 may comprise a processor of an electronic apparatus, e.g., a Central Processing Unit (CPU) or a System on Chip (SoC) (e.g., an Application Processor (AP)). The host end apparatus 101 may be configured to send or receive data to or from the memory system 102.

In some implementations, the memory controller 104 is coupled to the memory devices 103 and the host end apparatus 101 and configured to control the memory devices 103. The memory controller 104 can manage data stored in the memory devices 103 and communicate with the host end apparatus 101. In some implementations, the memory controller 104 is designed for operating in a low duty-cycle environment such as a Secure Digital Card, a Compact Flash Card (CFC), and a Universal Serial Bus (USB) flash drive, or operating in other media for use in electronic apparatuses, such as a personal computer, a digital camera, a mobile phone, etc. In some other implementations, the memory controller 104 is designed for operating in a high duty-cycle environment, such as a Solid State Drive or an Embedded Multi-Media Card (eMMC).

In some examples, the memory controller 104 and the one or more memory devices 103 can be integrated into various types of storage apparatuses, that is, the memory system 102 can be implemented and packaged into different types of end electronic products.

Figure 3:
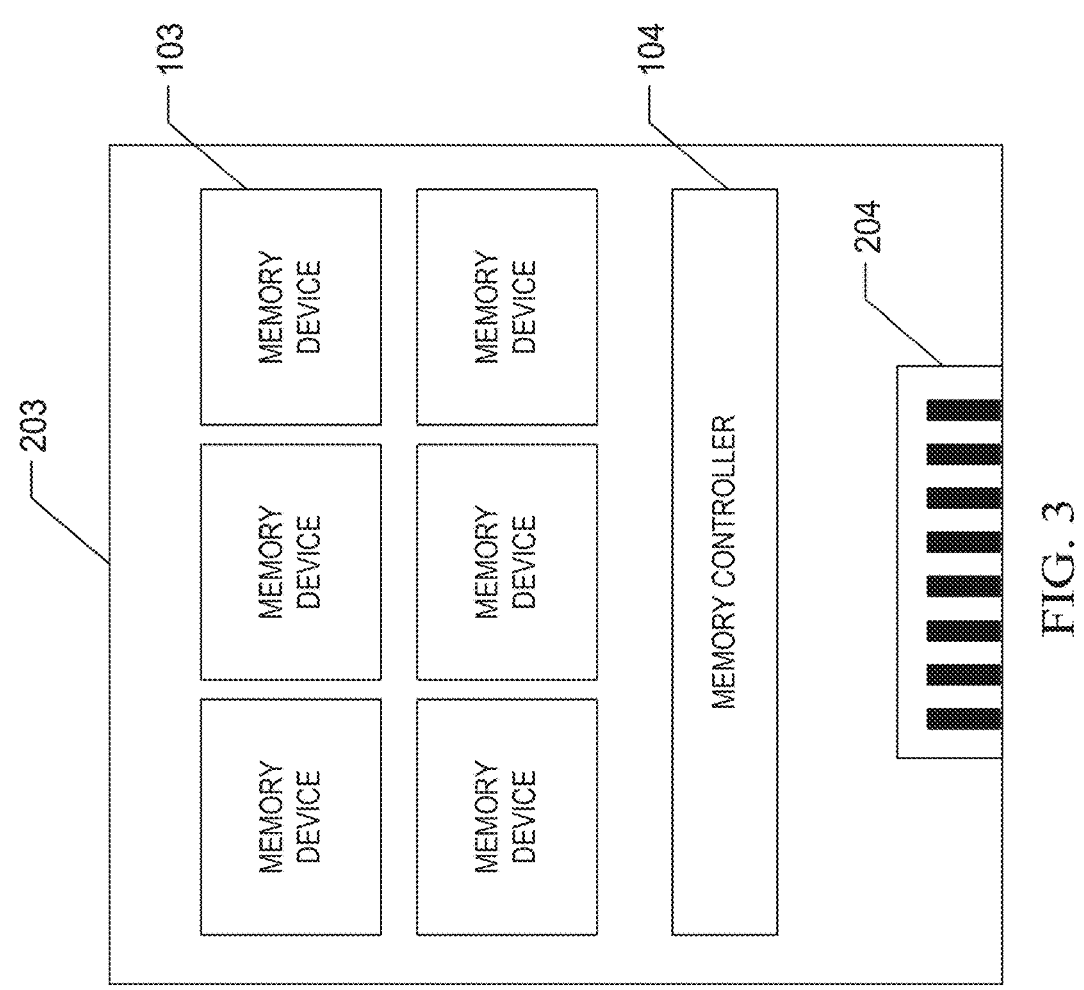
FIG. 3 is a schematic diagram of a solid state drive having a memory system provided by examples of the present disclosure.
Figure 2:
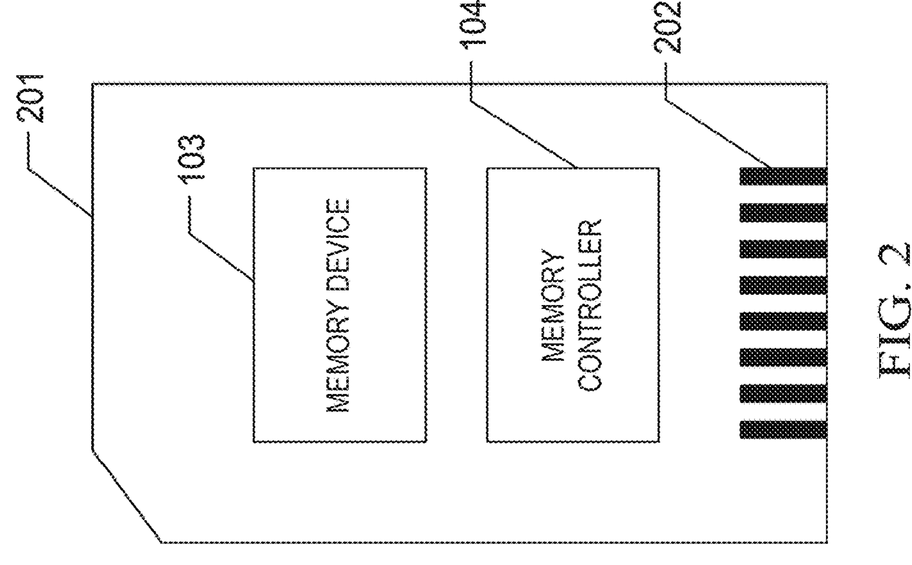
FIG. 2 is a schematic diagram of a memory card having a memory system provided by examples of the present disclosure.

In one example as shown in FIG. 2, the memory controller 104 and a single memory device 103 may be integrated into a memory card 201. The memory card 201 may be one of a Compact Flash Card, a Smart Media Card (SMC), a Memory Stick (MS), a Multi-Media Card (MMC) (such as an RS-MMC, an MMCmicro, and an eMMC, etc.), a Secure Digital Card (such as a Mini SD Card, a Micro SD card, and an SDHC card, etc.), and a universal flash card. The memory card 201 may further comprise a memory card connector 202 that couples the memory card 201 with a host end apparatus (e.g., the host end apparatus 101 in FIG. 1). In another example as shown in FIG. 3, the memory controller 104 and a plurality of memory devices 103 may be integrated into an SSD 203. The SSD 203 may further comprise an SSD connector 204 that couples the SSD 203 with a host end apparatus (e.g., the host end apparatus 101 in FIG. 1). In some implementations, a storage capacity and/or an operation speed of the SSD 203 are greater than a storage capacity and/or an operation speed of the memory card 201.

Figure 4:
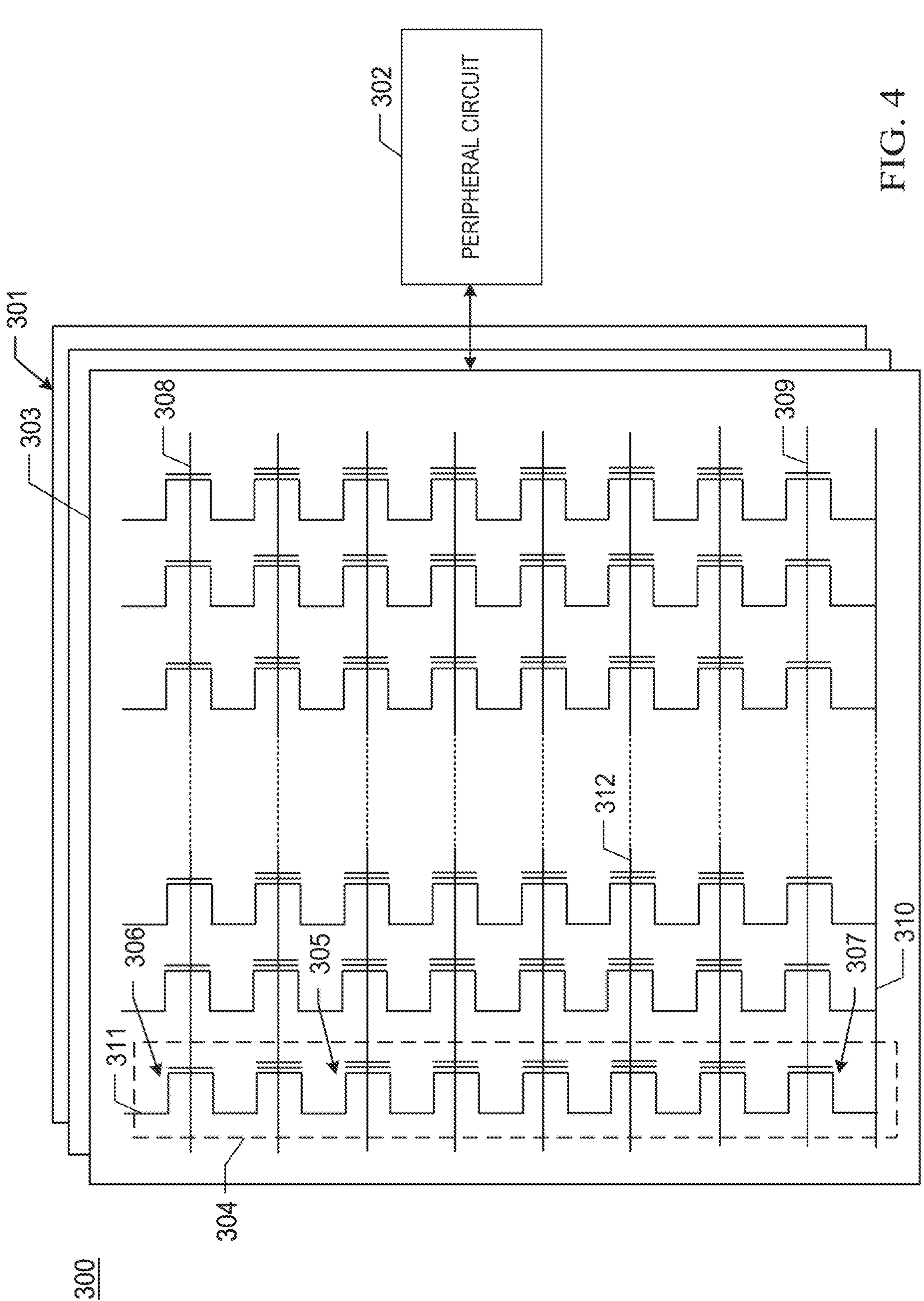
FIG. 4 is a schematic diagram of a memory device comprising a peripheral circuit provided by examples of the present disclosure.

FIG. 4 is a schematic circuit diagram of an example memory device 300 comprising a peripheral circuit provided by examples of the present disclosure. The memory device 300 may be an example of the memory devices 103 in FIG. 1. The memory device 300 may comprise a memory array 301 and a peripheral circuit 302 coupled to the memory array 301. Taking the memory array 301 being a three-dimensional NAND memory array as an example for illustration, memory cells 305 are NAND memory cells, and the memory cells 305 are provided in an array of memory strings 304, with each memory string 304 extending vertically above a substrate (not shown). In some implementations, each memory string 304 comprises a plurality of memory cells 305 that are coupled in series and stacked vertically. Each memory cell 305 can hold a continuous analog value, such as a voltage or charge, which depends on the number of electrons trapped within a region of memory cells 305. Each memory cell 305 may be either a floating gate memory cell that includes a floating gate transistor, or a charge trap memory cell that includes a charge trap transistor.

In some implementations, each memory cell 305 is a Single Level Cell (SLC) that has two possible memory states and thus can store one bit of data. For example, a first memory state "0" may correspond to a first voltage range, and a second memory state "1" may correspond to a second voltage range. In some implementations, each memory cell 305 is a multiple level cell capable of storing more than a single bit of data in four or more memory states, e.g., a Multiple Level Cell (MLC) that stores two bits per cell, a Triple Level Cell (TLC) that stores three bits per cell, or a Quad Level Cell (QLC) that stores four bits per cell.

As shown in FIG. 4, each memory string 304 may comprise a Bottom Select Transistor (BST) 307 at a source terminal thereof and a Top Select Transistor (TST) 306 at a drain terminal thereof. The bottom select transistor 307 and the top select transistor 306 may be configured to activate the selected memory string 304 during read and program operations. In some implementations, sources of the memory strings 304 in the same memory block 303 may be coupled through a Common Source Line (CSL) 310. In other words, all the memory strings 304 in the same memory block 303 have an Array Common Source (ACS). According to some implementations, the top select transistor 306 of each memory string 304 is coupled to a respective Bit Line (BL) 311 which data can be read from or written to via an output bus (not shown). In some implementations, each memory string 304 is configured to be selected or deselected by applying a select voltage (e.g., a voltage above a threshold voltage of the top select transistor 306) or a deselect voltage (e.g., 0 V) to the respective top select transistor 306 via one or more Top Select Lines (TSLs) 308 and/or by applying a select voltage (e.g., a voltage above a threshold voltage of the bottom select transistor 307) or a deselect voltage (e.g., 0 V) to the respective bottom select transistor 307 via one or more Bottom Select lines (BSLs) 309.

As shown in FIG. 4, the memory strings 304 can be organized into a plurality of memory blocks 303, and each of the plurality of memory blocks 303 may have a common source line 310. In some implementations, each memory block 303 is a basic data unit for an erase operation, that is, all the memory cells 305 on the same memory block 303 are erased at the same time. In order to erase the memory cells 305 in a selected memory block, the common source line 310 coupled to the selected memory block as well as unselected memory blocks that are in the same plane as the selected memory block may be biased with an erase voltage. In some examples, the erase operation may be performed at a half memory block level, a quarter memory block level, or a level with any suitable number of memory blocks or any suitable fraction of a memory block. The memory cells 305 of adjacent memory strings 304 may be coupled through a word line 312, and the word line 312 selects a row of memory cells 305 affected by the read or program operation.

Figure 5:
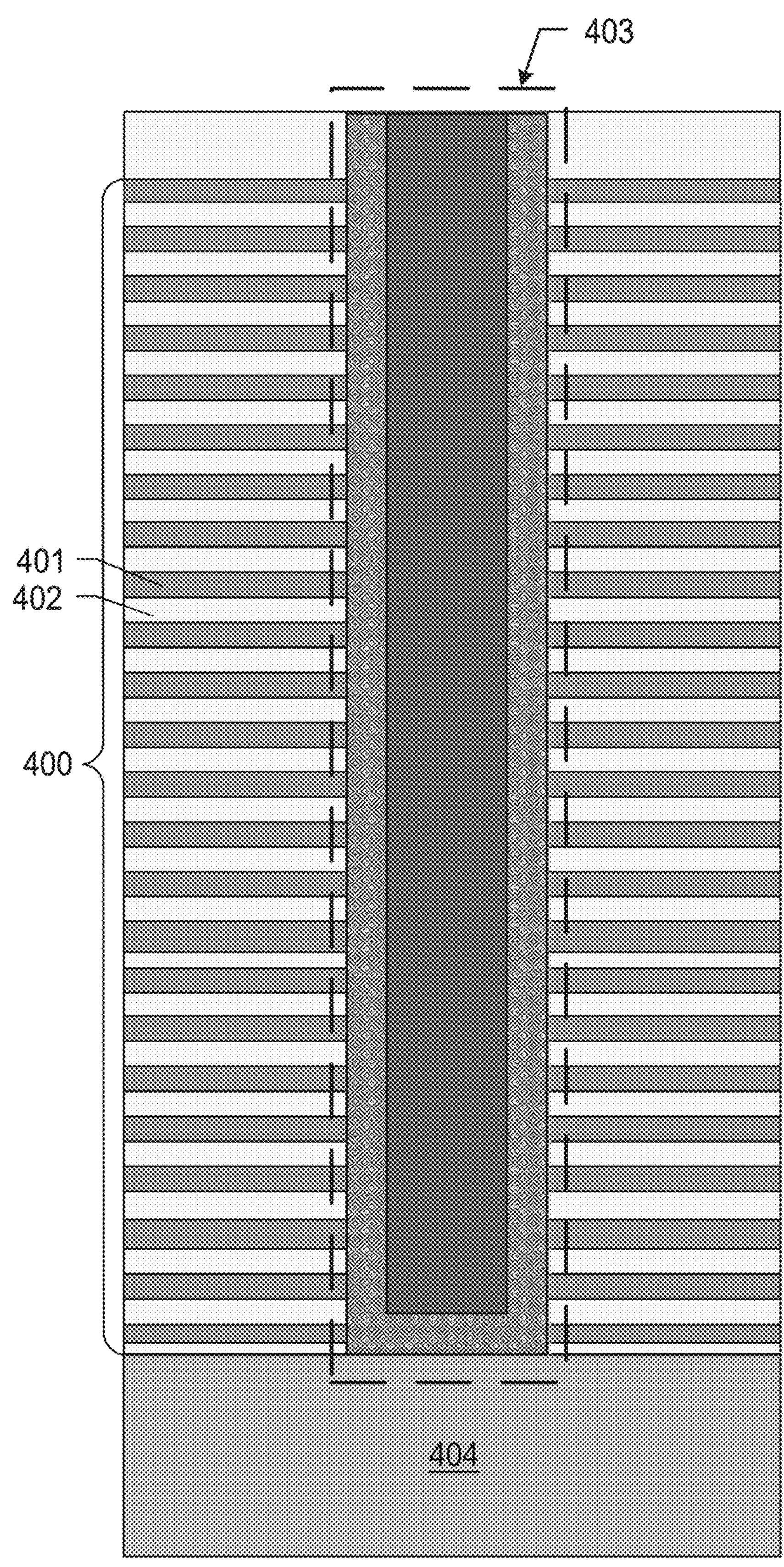
FIG. 5 is a schematic sectional diagram of a memory array comprising a memory string provided by examples of the present disclosure.

FIG. 5 is a schematic sectional diagram of a memory array comprising a memory string provided by examples of the present disclosure. As shown in FIG. 5, the memory array may comprise a stack structure 400, and the stack structure 400 comprises a plurality of gate layers 401 and a plurality of insulation layers 402 that are disposed as being stacked sequentially and alternately, and a channel structure 403 penetrating through the gate layers 401 and the insulation layers 402 vertically. The gate layers 401 and the insulation layers 402 may be stacked alternately, with two adjacent ones of the gate layers 401 being separated by one insulation layer 402. The number of memory cells included in the memory array is primarily related to the number of pairs of the gate layers 401 and the insulation layers 402 in the stack structure 400.

A composition material of the gate layers 401 may include a conductive material. The conductive material includes, but is not limited to, tungsten (W), cobalt (Co), copper (Cu), aluminum (Al), polysilicon, doped silicon, a silicide, or any combination thereof. In some implementations, each gate layer 401 comprises a metal layer, e.g., a tungsten layer. In some implementations, each gate layer 401 comprises a doped polysilicon layer. The plurality of gate layers 401 surround the channel structure 403, so as to constitute one memory string. The gate layer 401 at the top of the stack structure 400 may extend laterally as a top select gate line, the gate layer 401 at the bottom of the stack structure 400 may extend laterally as a bottom select gate line, and the gate layers 401 that extend laterally between the top select gate line and the bottom select gate line may act as word line layers.

In some examples, the stack structure 400 may be disposed on a substrate 404. The substrate 404 may include silicon (e.g., monocrystalline silicon), silicon germanium (SiGe), gallium arsenide (GaAs), germanium (Ge), silicon on insulator (SOI), germanium on insulator (GOI), or any other suitable materials.

In some other examples, the memory array may comprise only the stack structure 400 and comprise no substrate, and whether the memory array comprises the substrate is not limited in the present disclosure.

In some implementations, the channel structure 403 comprises a functional layer, a channel layer, and an insulation filling layer. In some implementations, the channel layer includes silicon, e.g., polysilicon. In some implementations, the functional layer is a composite dielectric layer comprising a tunneling layer, a storage layer (also referred to as a "charge trap layer/storage layer"), and a blocking layer. The channel structure 403 may have a cylindrical shape (e.g., a pillar shape). According to some implementations, the channel layer, the tunneling layer, the storage layer, and the blocking layer are arranged radially from a center toward an outer surface of a pillar in this order. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the functional layer may include a composite layer of silicon oxide/silicon oxynitride/silicon oxide (ONO).

Figure 6:
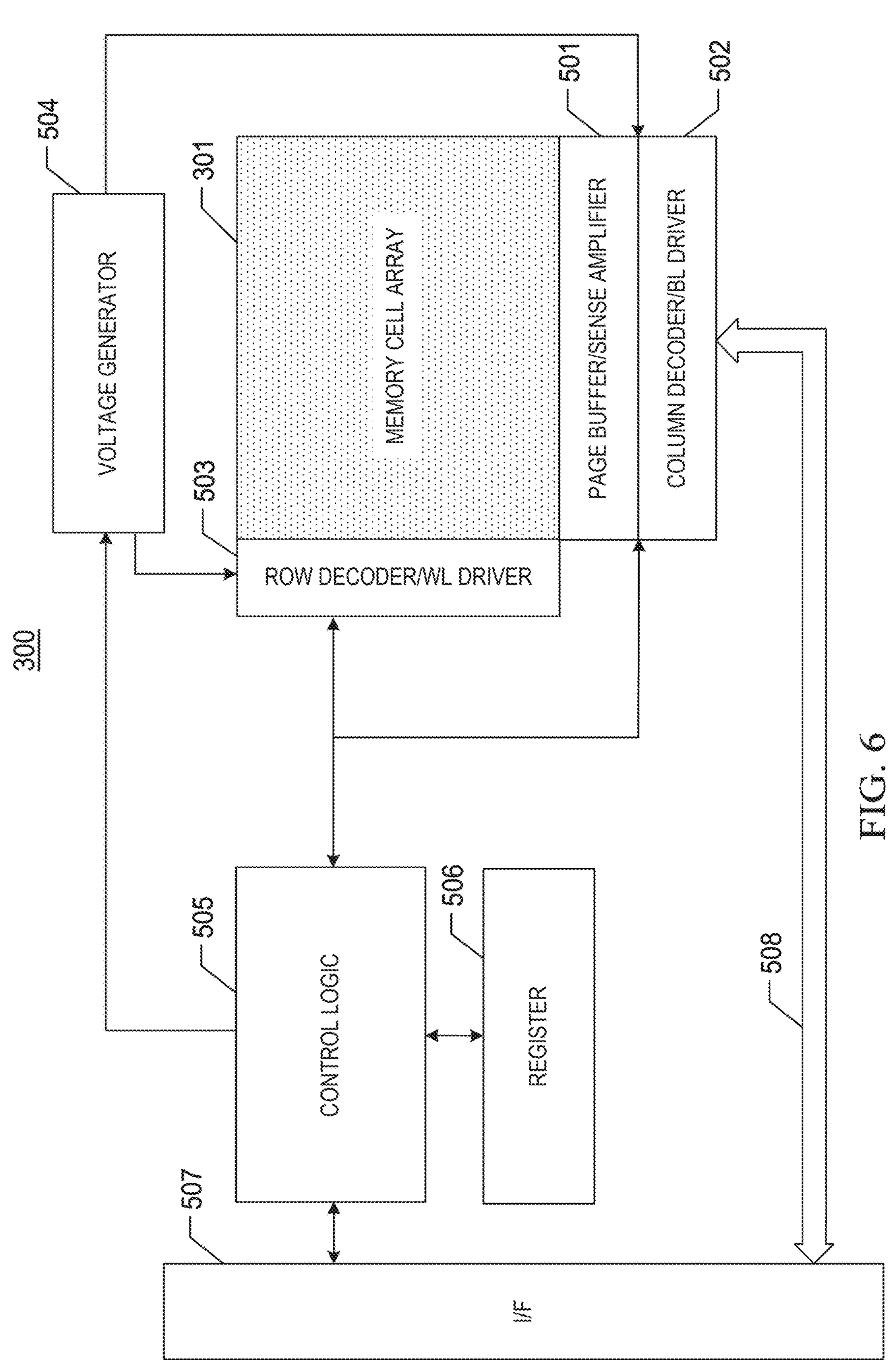
FIG. 6 is a schematic diagram of a memory device comprising a memory array and a peripheral circuit provided by examples of the present disclosure.

Referring back to FIG. 4, the peripheral circuit 302 may be coupled to the memory array 301 through bit lines 311, word lines 312, the common source line 310, the bottom select line 309, and the top select line 308. The peripheral circuit 302 may include any suitable analog, digital, and hybrid signal circuits for implementing operations on the memory array 301 by applying voltage signals and/or current signals to each target memory cell 305 and sensing voltage signals and/or current signals from each target memory cell 305 via the bit lines 311, the word lines 312, the common source line 310, the bottom select line lines 309, and the top select line 308. The peripheral circuit 302 may include various types of peripheral circuits formed using a metal-oxide-semiconductor technology. For example, FIG. 6 shows some example peripheral circuits. The peripheral circuit 302 comprises a page buffer/sense amplifier 501, a column decoder/bit line driver 502, a row decoder/word line driver 503, a voltage generator 504, a control logic unit 505, a register 506, a flash interface 507, and a data bus 508. In some examples, an additional peripheral circuit not shown in FIG. 6 may also be included.

The page buffer/sense amplifier 501 may be configured to read and program (write) data from and to the memory array 301 according to control signals from the control logic unit 505. In one example, the page buffer/sense amplifier 501 may store one page of program data (write data) to be programmed into the memory array 301. In another example, the page buffer/sense amplifier 501 may perform a program verify operation to ensure that data is properly programmed into the memory cells that are coupled to a selected word line. In yet another example, the page buffer/sense amplifier 501 may also sense a low power signal from the bit lines that represents a data bit stored in the memory cells, and amplify a small voltage swing to a recognizable logic level in a read operation. The column decoder/bit line driver 502 may be configured to be controlled by the control logic unit 505 and select one or more memory strings by applying bit line voltages generated from the voltage generator 504.

The row decoder/word line driver 503 may be configured to be controlled by the control logic unit 505, select/deselect a memory block of the memory array 301, and select/deselect a word line of the memory block. The row decoder/word line driver 503 may be further configured to drive the word line using a word line voltage generated from the voltage generator 504. In some implementations, the row decoder/word line driver 503 may also select/deselect and drive the bottom select line and the top select line. As described below in detail, the row decoder/word line driver 503 is configured to perform a program operation on the memory cells that are coupled to (one or more) selected word lines. The voltage generator 504 may be configured to be controlled by the control logic unit 505 and generate a word line voltage (such as a read voltage, a program voltage, a pass voltage, a local voltage, and a verify voltage, etc.), a bit line voltage, and a source line voltage to be supplied to the memory array 301.

The control logic unit 505 may be coupled to each peripheral circuit described above and configured to control operations of each peripheral circuit. The register 506 may be coupled to the control logic unit 505, and include a state register, a command register, and an address register for storing state information, a command operation code (OP code), and a command address that are used for controlling the operations of each peripheral circuit. The flash interface 507 may be coupled to the control logic unit 505, and act as a control buffer to buffer and relay a control command received from a host end apparatus (not shown) to the control logic unit 505 as well as buffer and relay state information received from the control logic unit 505 to the memory controller. The flash interface 507 may be also coupled to the column decoder/bit line driver 502 via the data bus 508, and act as a data I/O interface and a data buffer to buffer and relay data to and from the memory array 301.

Figure 7:
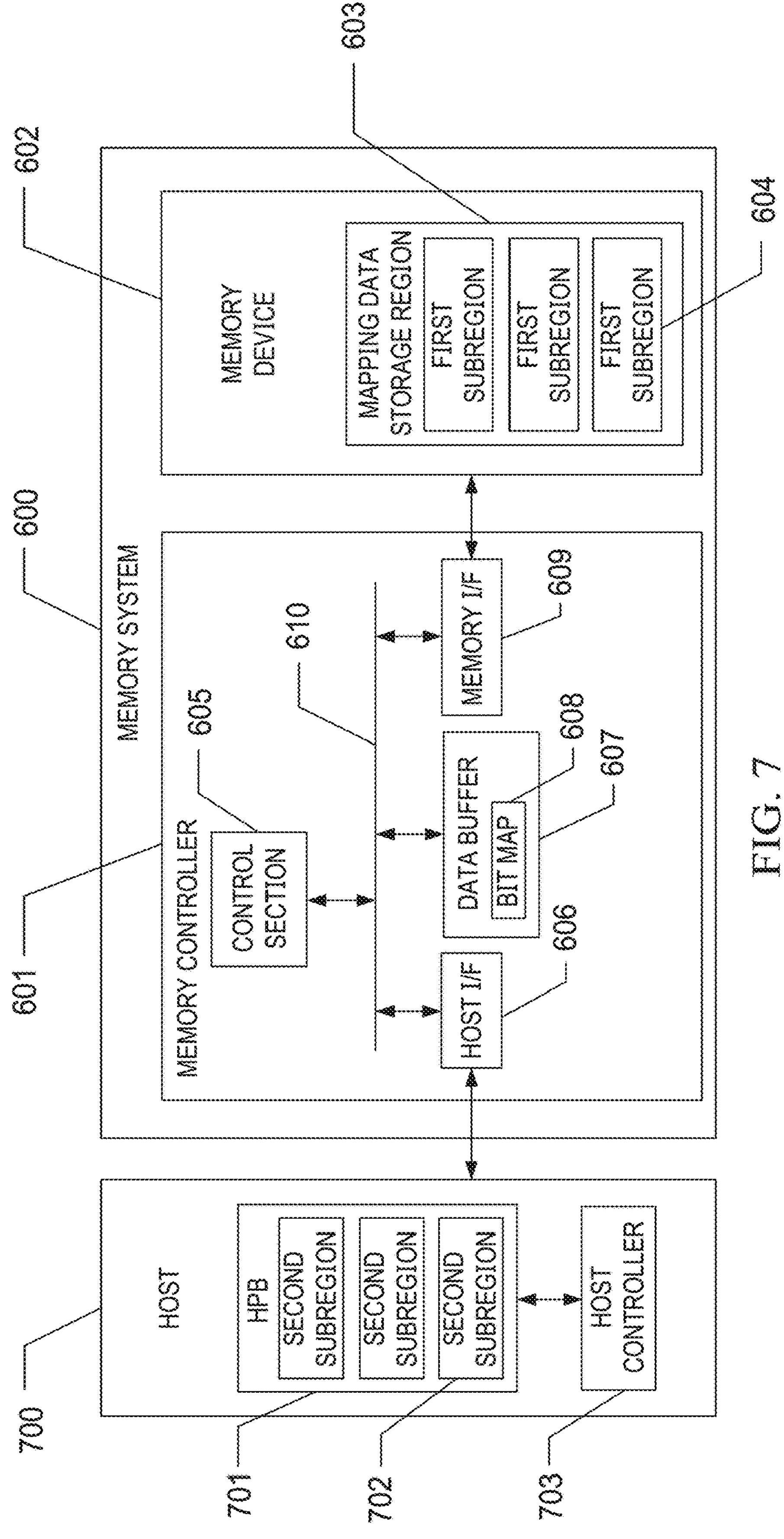
FIG. 7 is a schematic diagram of a system comprising a host and a memory system provided by examples of the present disclosure.

FIG. 7 is a schematic diagram of a system comprising a host and a memory system provided by examples of the present disclosure. As shown in FIG. 7, a memory system 600 comprises a memory controller 601 and a memory device 602, wherein the memory controller 601 is configured to control the memory device 602 to perform read and write operations. Here, the memory controller 601 and the memory device 602 may be coupled in any suitable way. The memory controller 601 comprises a control section 605, a data buffer 607, a host I/F interface 606, and a memory I/F interface 609, etc. The memory device 602 may include a three-dimensional NAND memory as shown in FIGS. 4 to 6.

In some examples, the host I/F interface 606 outputs a command and valid data (write data), etc. received from a host 700 to an internal bus 610, and sends valid data (write data) read from the memory device 602 and a response from the control section 605, etc. to the host 700. The memory I/F interface 609 controls processing of writing and reading data, etc. to and from the memory device 602 based on an indication of the control section 605. The control section 605 controls the memory system 600 as a whole, and the control section 605 is, for example, a central processor, a Micro Processor Unit (MPU), or the like. The control section 605 performs control according to a command in the case where it receives the command from the host 700 via the host I/F interface 606. For example, the control section 605 indicates the memory I/F interface 609 to write data to the memory device 602 according to the command from the host 700.

Furthermore, the control section 605 indicates the memory I/F interface 609 to read data from the memory device 602 according to the command from the host 700.

In some examples, the memory controller 601 is configured to perform mapping management on data stored in the memory device 602. In an example, the memory controller may update and maintain a logical address to physical address (L2P) mapping table, i.e., an L2P table, wherein each L2P entry in the L2P table may represent a mapping relationship between one logical address and one physical address. When the host 700 sends a read command comprising a logical address to the memory controller 601, the memory controller 601 may acquire a corresponding physical address based on the L2P table and the logical address in the read command, and read data from the memory device 602 based on the physical address and send the data to the host 700.

In some examples, the memory controller 601 comprises a data buffer 607, and the data buffer 607 may include, but is not limited to, a Static Random-Access Memory (SRAM). Meanwhile, the memory system 600 further comprises a memory configured to store the L2P table, e.g., a Dynamic Random-Access Memory (DRAM), and the memory controller 601 may acquire the L2P table from the DRAM quickly, thereby achieving high read efficiency.

In some other examples, in consideration of a package size, power consumption, and costs, no DRAM may be disposed as a cache space in the memory system 600. In this case, due to a limited storage space in the memory controller 601, the memory controller 601 is configured to store the L2P table, which is a secondary mapping table and occupies a large storage space, in a mapping data storage region 603 of the memory device 602, and to store only a primary mapping table that occupies a small storage space in the data buffer 607. When the memory controller 601 receives a read command packet comprising the read command and the logical address, the memory controller 601 may acquire a storage location of the L2P table needed to be used in the memory device 602 according to the primary mapping table, read a portion of the L2P table needed to be used from the memory device 602, then acquire the physical address according to the logical address and the read portion of the L2P table and perform a read operation. That is, the read operation is required to be performed two times so as to read the data, resulting in low efficiency of the read operation. In an example, for a random read operation, one time of the random read operation may require reading a large amount of L2P tables from the memory device 602, resulting in poor performance of the random read operation.

In some examples, with continued reference to FIG. 7, in order to solve the problem of the low efficiency of the read operation and the poor performance of the random read operation in the above examples, a system architecture comprising a Host Performance Booster (HPB) 701 is proposed. In an example, a portion of a storage space in the host 700 may be classified as the host performance booster 701 to serve as a cache space for the mapping data. The memory controller 601 may send a portion of the mapping data to the host 700, and the host 700 may cache the mapping data in the host performance booster 701, wherein the mapping data comprises the L2P table here. As such, the host 700 may send an HPB read command packet to the memory system 600 to read the data, and the HPB read command packet may comprise the physical address of the data to be read by the host 700. The physical address may be acquired according to the mapping data cached in the host performance booster 701. The memory controller 601 may read the data from the memory device 602 directly according to the physical address in the HPB read command packet, without the need to reading the mapping data from the memory device 602, thereby effectively improving the efficiency of the read operation and improving the performance of the random read operation.

However, after the memory system 600 performs a background operation such as garbage collection, the mapping relationship between logical address and physical address may be changed, and thus an update of the mapping data is required. After the mapping data stored in the memory device 602 and cached in the host performance booster 701 is updated, the mapping data stored in the host performance booster 701 becomes invalid, and therefore, an update of the mapping data in the host performance booster 701 is also required. When an update frequency of the mapping data in host performance booster 701 is high, a negative impact on the performance of the system may be caused. When the mapping data cannot be updated timely, an HPB read operation cannot be performed, thereby causing degradation of the performance of the random read operation. Therefore, an update trigger mechanism for the mapping data in the host performance booster is required to be optimized, so as to improve the overall performance of the system. In this regard, the present disclosure proposes the following implementations.

The present disclosure provides a memory system. As shown in FIG. 7, the memory system 600 comprises the memory device 602 and the memory controller 601 coupled with the memory device 602, wherein the memory controller 601 is coupled with the host 700; the memory device 602 comprises a plurality of first subregions 604 storing mapping data, and the host 700 comprises a plurality of second subregions 702 corresponding to the plurality of first subregions 604.

Under the HPB system architecture, a logical address space may be divided into a plurality of HPB regions, each HPB region may be divided into a plurality of HPB subregions, and each HPB subregion stores a plurality of L2P entries. The mapping data may be cached in the host performance booster 701 in units of the HPB subregions, and an HPB subregion cached in the host performance booster 701 is an activated HPB subregion.

In the examples of the present disclosure, a first subregion 604 is an activated HPB subregion in the memory device 602, that is, the first subregion 604 may be just a portion of the mapping data storage region 603, and the mapping data storage region 603 further comprises an unactivated HPB subregion. Mapping data in a second subregion 702 in the host performance booster 701 corresponds to mapping data in the activated HPB subregion, that is, the first subregion 604 is in one-to-one correspondence with the second subregion 702, and logical address ranges of the mapping data stored in a first subregion 604 and a second subregion 702 corresponding to each other are the same.

Numbers of the first subregions 604 and the second subregions 702 shown in FIG. 7 are merely examples, and the present disclosure does not limit the numbers of the first subregions 604 and the second subregions 702.

In the examples of the present disclosure, the mapping data comprises a logical address to physical address mapping relationship, wherein the logical address may be a Logical Block Address (LBA) and the physical address may be a Physical Block Address (PBA). The physical block address of the data corresponds to a location of a memory block where the data is located in the memory device 602.

In some examples, the memory controller 601 is configured to: divide the first subregion 604 into a plurality of data units; when mapping data in a data unit is changed, label the data unit; and based on the number of the labeled data units in the first subregion 604, determine whether to trigger an update of the mapping data in the second subregion 702 corresponding to the first subregion 604.

In some examples, the memory controller 601 is configured to: establish a bit map for the first subregion 604, with one bit in the bit map corresponding to one of the data units in the first subregion 604, so as to divide the first subregion 604 into the plurality of data units.

In some examples, as shown in FIG. 7, the data buffer 607 in the memory controller 601 may comprise a bit map storage region 608, and the bit map for the first subregion 604 may be stored in the bit map storage region 608 in the data buffer 607.

In some examples, the number of the data units in one first subregion 604 ranges from 8 to 1024.

FIG. 8 is a bit map provided by an example of the present disclosure. As shown in FIG. 8, the bit map for one first subregion 604 may comprise 32 bits and one bit corresponds to one data unit, whereby one first subregion 604 may be divided into 32 data units.

In some examples, each data unit in the first subregion 604 has the same size, that is, the first subregion 604 may be divided equally into the plurality of data units each having a mapping data storage space of the same size.

In an example, when a size of the first subregion 604 is 16 MB and one first subregion 604 is divided into 32 data units, the size of each data unit is 512 KB.

In some examples, the mapping data comprises a plurality of L2P entries each having the same size. After the first subregion 604 is divided equally into the plurality of data units, each data unit has the same number of L2P entries, and logical addresses for the L2P entries in the first subregion 604 are consecutive. As such, a logical address range of mapping data in each data unit may be determined according to a start logical address of the mapping data in the first subregion 604 and the number of the L2P entries in each data unit. When a physical address corresponding to a logical address in one L2P entry is changed, the first subregion 604 and the data unit to which the L2P entry belongs may be determined according to the logical address in the L2P entry.

In some examples, when the mapping data in the first subregion 604 is cached in the host performance booster 701, the memory controller 601 may set each bit in the bit map for the first subregion 604 to 0, representing that the mapping data in the first subregion 604 is the same as the mapping data in the second subregion 702 and the mapping data in the second subregion 702 is valid. In this case, when the host 700 sends the HPB read command packet comprising a physical address according to the mapping data in the second subregion 702, the memory controller 601 can read the data from the memory device 602 directly according to the physical address in the HPB read command packet, that is, the HPB read operation can be performed.

The memory controller 601 may perform a background operation of changing the mapping data, in the case of no request from the host 700. For example, the memory controller 601 may perform background operations such as a garbage collection operation, a data migration operation of an SLC buffer, a read recovery operation, and a wear leveling operation, etc., in the case of no request from the host 700. The garbage collection operation may be an operation of moving valid data stored in a sacrificed block (containing valid data and invalid data) to an idle block serving as a target block and erasing the sacrificed block. The data migration operation of the SLC buffer may be an operation of migrating and writing data in an SLC block stored in the memory device 602 to an MLC block, a TLC block, or a QLC block. The read recovery operation may be an operation of rewriting data of a memory block whose threshold voltage distribution is deteriorated due to repeated read operations to another memory block. The wear leveling operation may be an operation of moving data between memory blocks in the memory device 602 to achieve uniform use of the memory blocks. All of the above background operations may change the physical address of the data, and after the physical address of the data is changed, the mapping relationship between the logical address and the physical address is also changed accordingly. If the logical address falls within the logical address range of the mapping data in the first subregion 604, it is required to perform an update of the mapping data in the first subregion 604. In this case, the mapping data in the first subregion 604 is no longer the same as the mapping data in the corresponding second subregion 702. In an example, the same logical address corresponds to different physical addresses, resulting in invalidation of the mapping data in the second subregion 702.

In some examples, the memory controller 601 is configured to: when a physical address corresponding to at least one logical address in the data unit is changed, label a bit corresponding to the data unit in the bit map, so as to label the data unit. In an implementation, when a physical address corresponding to one logical address is changed, the memory controller 601 may first determine a data unit to which an L2P entry corresponding to the logical address belongs, and flip a bit corresponding to the data unit in the bit map, e.g., setting the bit from a 0 to 1, so as to label the data unit. In this case, when the host 700 sends the HPB read command packet comprising the mapping data according to the mapping data in the second subregion 702, if the logical address of the mapping data in the HPB read command packet falls within a logical address range of the mapping data stored in the labeled data units, the mapping data is invalid. The memory controller 601 is required to acquire the mapping data from the first subregion 604 in order to acquire the physical address corresponding to the logical address, and perform the read operation, i.e., performing a normal read operation.

In an example, as shown in FIG. 8, in the bit map for the first subregion 604, bits corresponding to a data unit 5 and a data unit 7 are 1, and bits corresponding to other data units are 0, indicating that the data unit 5 and the data unit 7 are labeled due to a change in the mapping data. When the read command packet comprises the mapping data stored in the second subregion 702 and the logical address of the mapping data falls within a logical address range of mapping data in the labeled data units 5 and 7, the mapping data in the read command packet is invalid, and the memory controller 601 is required to perform the normal read operation. Furthermore, when the logical address of the mapping data falls within logical address ranges of mapping data of the other unlabeled data units, the mapping data in the read command packet is valid, and the memory controller 601 may perform the HPB read operation.

In some other examples, "1" may be used to indicate that the mapping data of the data unit corresponding to the bit in the bit map is unchanged, and "0" is used to indicate that the data unit corresponding to the bit is labeled due to the change in the mapping data.

Figure 9:
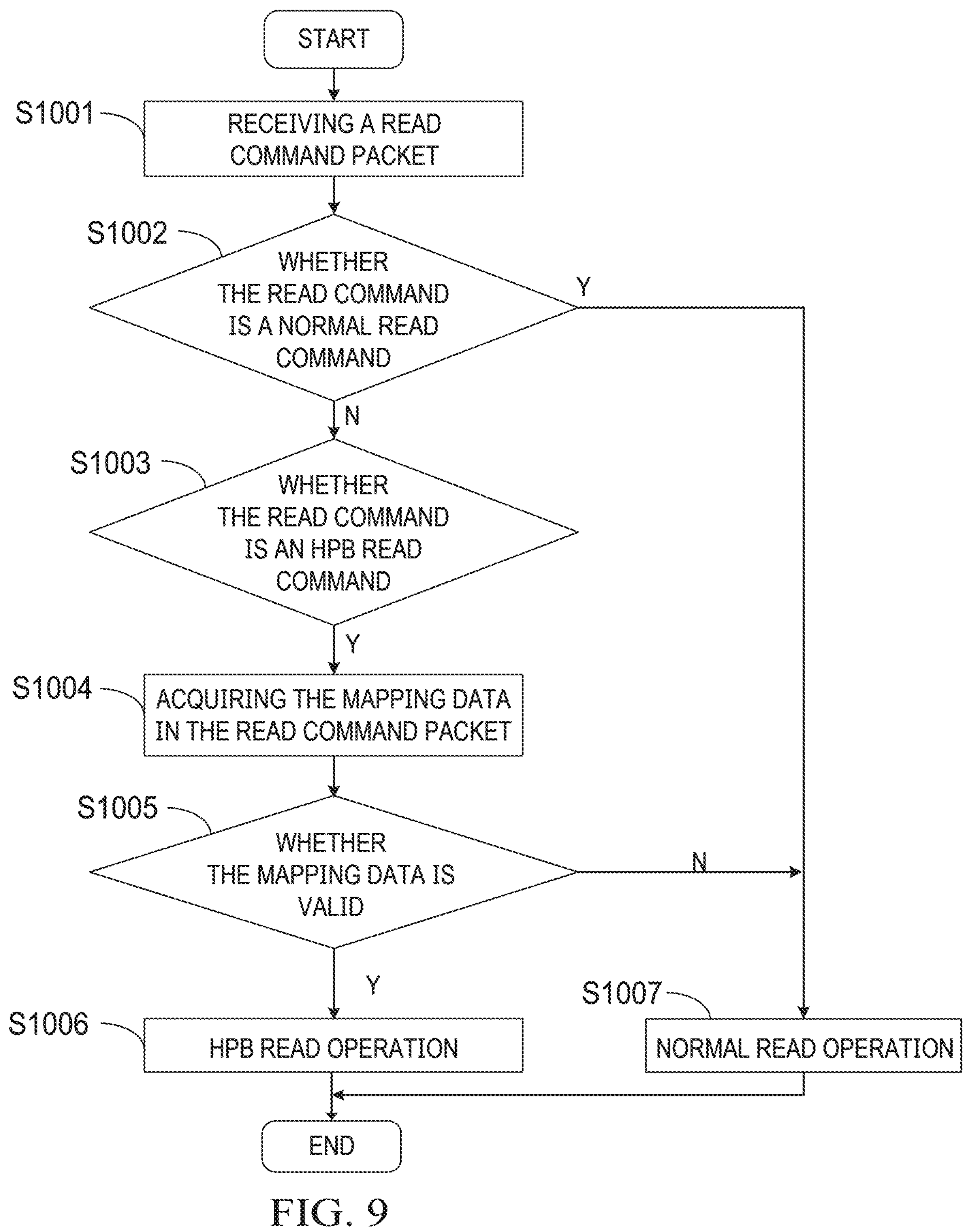
FIG. 9 is a framework flow diagram of a read operation provided by an example of the present disclosure.

In some examples, the memory controller 601 is configured to perform the read operation as shown in FIG. 9. In an implementation, the memory controller 601 is configured to: perform operation S1001, receiving the read command packet. Here, the read command packet may comprise the read command and address information of the data, and the read command may include a normal read command and an HPB read command. When the read command is a normal read command, the address information of the data comprises only the logical address of the data. When the read command is an HPB read command, the address information of the data may comprise the mapping data stored in the second subregion 702, i.e., the address information of the data comprises both the logical address of the data and the physical address of the data.

The memory controller 601 is further configured to: perform operation S1002, determining whether the read command in the read command packet is the normal read command; if the read command is the normal read command, perform operation S1007, carrying out the normal read operation; if the read command is not the normal read command, perform operation S1003, determining whether the read command is the HPB read command; and if the read command is the HPB read command, perform operation S1004, acquiring the mapping data in the read command packet.

The memory controller 601 is further configured to: perform operation S1005, determining whether the mapping data is valid. An example process may comprise: determining whether the logical address of the mapping data falls within the logical address range of the mapping data stored in the labeled data units. When the logical address of the mapping data in the read command packet falls within the logical address range of the mapping data stored in the labeled data units, it represents that the physical address corresponding to the logical address of the mapping data in the first subregion 604 may be changed, the mapping data is invalid, then operation S1007 is performed to carry out the normal read operation, i.e., acquiring the physical address corresponding to the logical address in the read command packet from the first subregion 604 and performing the read operation. When the logical address of the mapping data in the read command packet falls outside the logical address range of the mapping data stored in the labeled data units, the mapping data is valid, then operation S1008 is performed to carry out the HPB read operation, i.e., performing the read operation based on the physical address in the read command packet.

In the examples of the present disclosure, only when the logical address of the mapping data in the HPB read command packet falls within the logical address range of the mapping data stored in the labeled data units, the mapping data is determined as being invalid. That is, for the plurality of data units in the first subregion 604, labeling one or more of the data units does not affect validity of the mapping data in the other unlabeled data units.

Figure 10:
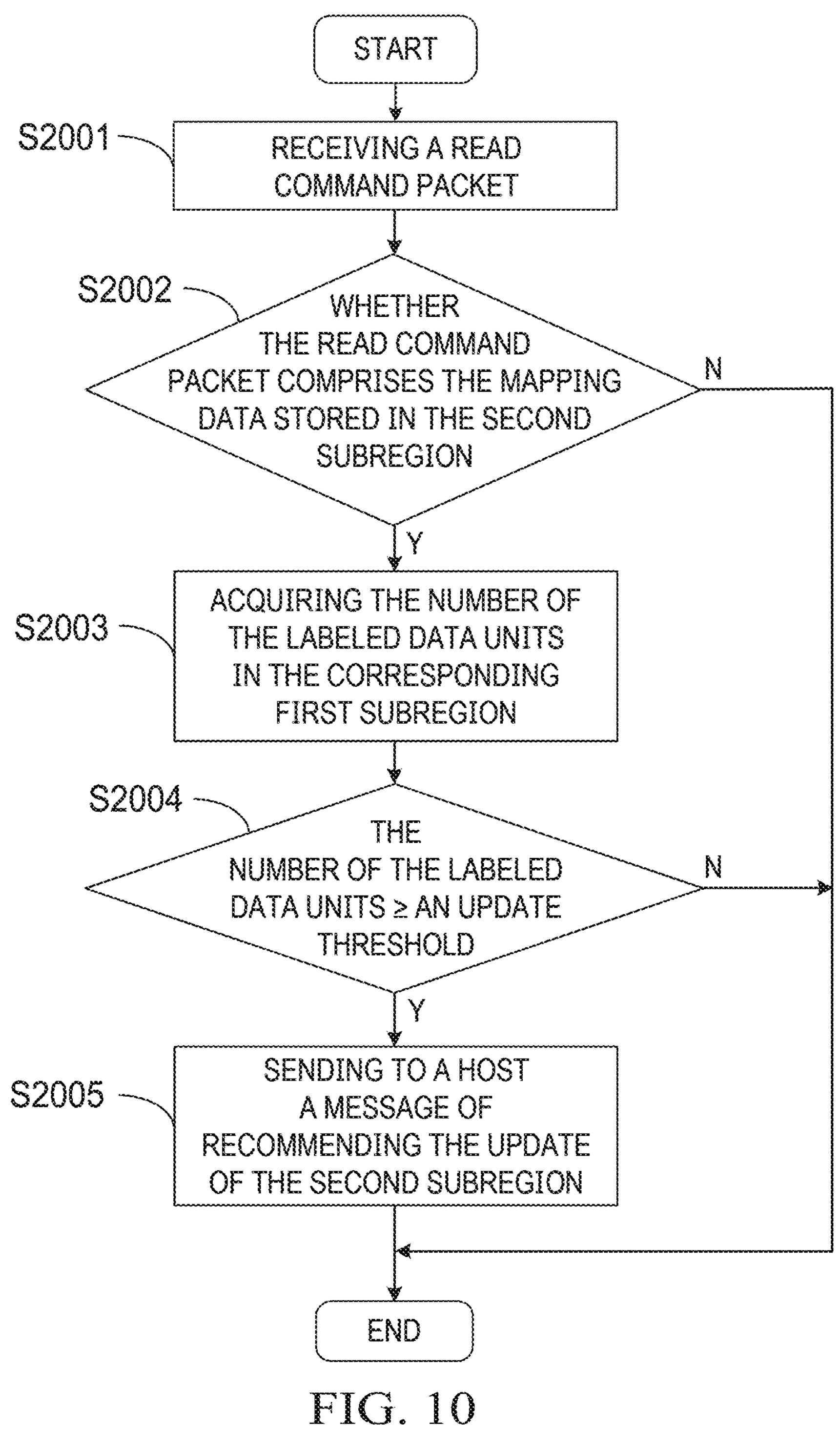
FIG. 10 is a framework flow diagram of a validity management operation provided by an example of the present disclosure.

In an example, the memory controller 601 is configured to perform a validity management operation as shown in FIG. 10. In an implementation, the memory controller 601 is configured to: perform operation S2001, receiving the read command packet; perform operation S2002, determining whether the read command packet comprises the mapping data stored in the second subregion 702; and when the read command packet comprises the mapping data stored in the second subregion 702, perform operation S2003, acquiring the number of the labeled data units in the first subregion 604 corresponding to the second subregion 702.

Here, when the read command packet received by the memory controller 601 comprises the mapping data in the second subregion 702, i.e., when the read command packet is the HPB read command packet, the memory controller 601 may calculate the number of the labeled data units in the first subregion 604 corresponding to the second subregion 702, e.g., may acquire the number of the labeled data units in the first subregion 604 by calculating the number of "1" in the bit map for the first subregion 604.

The memory controller 601 is further configured to: perform operation S2004, comparing the number of the labeled data units in the first subregion 604 with a preset update threshold; when the number of the labeled data units in the first subregion 604 is greater than or equal to the update threshold, determine to trigger the update of the mapping data in the second subregion 702 corresponding to the first subregion 604, and perform operation S2005, sending a message of recommending the update of the second subregion 702; and when the number of the labeled data units in the first subregion 604 is less than the update threshold, determine not to trigger the update of the mapping data in the second subregion 702 corresponding to the first subregion 604.

In some examples, the memory controller 601 is further configured to: in response to determination of updating the mapping data in the second subregion 702, send the mapping data stored in the first subregion 604 corresponding to the second subregion 702.

In some examples, in response to determination of triggering the update of the mapping data in the second subregion 702 corresponding to the first subregion 604, the memory controller 601 may send, in response information of the read command, the message of recommending the update of the second subregion 702 to the host 700. In response to determination of updating the mapping data in the second subregion 702 by the host 700, the memory controller 601 may read the mapping data in the first subregion 604 corresponding to the second subregion 702 from the memory device 602, send same to the host 700, and at the same time, reset the respective bits in the bit map for the first subregion 604.

One first subregion 604 comprises a large number of logical address to physical address mapping relationships. If the validity of the mapping data is labeled in units of the first subregions 604, once the physical address corresponding to one logical address is changed, the entire first subregion 604 is labeled, causing invalidation of the all mapping data in the second subregion 702 corresponding to the first subregion 604. In addition, if the update of the mapping data of the second subregion 702 corresponding to the first subregion 604 is triggered once the first subregion 604 is labeled, then an update frequency would be excessively high, and many system resources would be occupied, thereby imposing a negative impact on the overall performance of the system. Furthermore, if the update frequency is reduced, the second subregion 702 cannot be updated timely, and a large amount of mapping data in the second subregion 702 is unavailable because the corresponding first subregion 604 is labeled as being invalid, that is, the HPB read operation cannot be performed, causing the degradation of the performance of the random read operation.

In the examples of the present disclosure, the memory controller 601 is configured to: label the first subregion 604 in units of the data units, and when the number of the labeled data units in the first subregion 604 reaches the update threshold or above, trigger the update of the second subregion 702. In this case, even if part of the data units in the first subregion 604 are labeled and the mapping data of the second subregion 702 corresponding to the first subregion 604 is not updated immediately, the mapping data in the second subregion 702 that does not fall within the logical address ranges of the labeled data units is still valid, thereby reducing the impact on the HPB read operation while controlling the update frequency, and reducing the degree of the performance degradation of the random read operation while avoiding occupying excessive system resources.

In some examples, a ratio of the update threshold to the number of the data units in the first subregion 604 ranges from 25% to 75%. For example, when the first subregion 604 is divided into 32 data units, the update threshold may range from 8 to 24.

In the examples of the present disclosure, the memory controller 601 is further configured to: adjust the number of the data units in the first subregion 604 and the update threshold according to a resource configuration situation of the system, so as to improve the flexibility of HPB subregion validity management.

In an example, when the system has sufficient resources to perform the HPB subregion validity management, the number of the data units in the first subregion 604 may be increased, so as to label the validity of the mapping data in units of smaller granularity, thereby improving the accuracy of the validity management. When resources of the system are insufficient, the number of the data units in the first subregion 604 may be reduced, so as to reduce the size of the bit map for the first subregion 604 and to reduce resources required for maintaining the bit map.

In another example, in the case where the number of the data units in the first subregion 604 remains unchanged, when the system has sufficient resources to perform the HPB subregion validity management, the update threshold may be decreased to increase the update frequency, so as to further improve the efficiency of performing the read operation by the system. When resources of the system are insufficient, the update threshold may be increased to decrease the update frequency.

Figure 11:
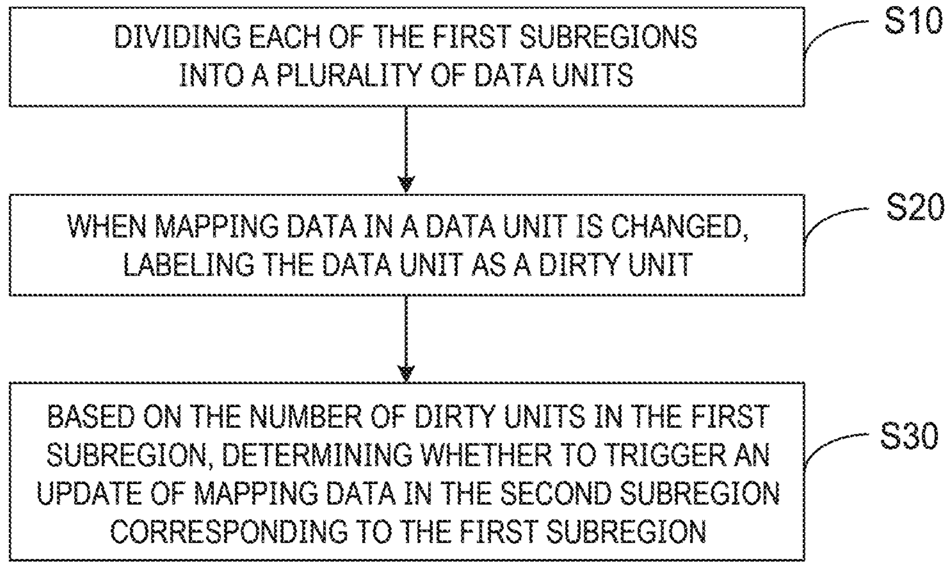
FIG. 11 is a flow diagram of an operation method of a memory system provided by an example of the present disclosure.

Based on a concept similar to that of the above memory system, the present disclosure provides an operation method of a memory system. FIG. 11 is a flow diagram of the operation method provided by the examples of the present disclosure. As shown in FIG. 9, the operation method of a memory system comprises the following operations:

- operation S10: dividing each of the first subregions into a plurality of data units;
- operation S20: when mapping data in a data unit is changed, labeling the data unit as a dirty unit; and
- operation S30: based on the number of dirty units in the first subregion, determining whether to trigger an update of mapping data in the second subregion corresponding to the first subregion.

In some examples, a process of performing operation S10 may comprise: establishing a bit map for the first subregion, with one bit in the bit map corresponding to one of the data units in the first subregion, so as to divide the first subregion into the plurality of data units.

In some examples, a process of performing operation S20 may comprise: when a physical address corresponding to at least one logical address in the data unit is changed, labeling a bit corresponding to the data unit in the bit map, so as to label the data unit.

In some examples, a process of performing operation S30 may comprise: when the number of the labeled data units in the first subregion is greater than or equal to the update threshold, determining to trigger the update of the mapping data in the second subregion corresponding to the first subregion; and when the number of the labeled data units in the first subregion is less than the update threshold, determining not to trigger the update of the mapping data in the second subregion corresponding to the first subregion.

In some examples, the operation method of a memory system further comprises: receiving a read command packet, and when the read command packet comprises the mapping data in the second subregion, acquiring the number of the labeled data units in the first subregion corresponding to the second subregion.

In some examples, the operation method of a memory system further comprises: in response to determination of triggering the update of the mapping data in the second subregion corresponding to the first subregion, sending a message of recommending an update of the second subregion.

In some examples, the operation method of a memory system further comprises: in response to determination of updating the mapping data in the second subregion, sending the mapping data stored in the first subregion corresponding to the second subregion.

In some examples, the operation method of a memory system further comprises: when a logical address of the mapping data in the read command packet falls within a logical address range of the mapping data stored in the labeled data units, acquiring a physical address corresponding to the logical address from the first subregion and performing a read operation; and when the logical address of the mapping data in the read command packet falls outside the logical address range of the mapping data stored in the labeled data units, performing a read operation based on a physical address in the read command packet.

In the examples of the present disclosure, the operation method of a memory system may be performed by the memory controller 601 in the memory system 600 in any of the above examples, and the technical effects that can be realized by the memory system in the above examples all can be realized by the operation method of the memory system, which are no longer repeated one by one here.

The present disclosure further provides an electronic apparatus that may comprise the system as shown in FIG. 7. As shown in FIG. 7, the electronic apparatus comprises a memory system 600 and a host 700 coupled with the memory system 600, wherein the memory system 600 comprises a memory device 602 and a memory controller 601 coupled with the memory device 602; the memory device 602 comprises a plurality of first subregions 604 storing mapping data; the host 700 comprises a host controller 703 and a plurality of second subregions 702 corresponding to the plurality of first subregions 604; the mapping data comprises a logical address to physical address mapping relationship; logical address ranges of mapping data stored in a first subregion 604 and a second subregion 702 corresponding to each other are the same.

In some examples, the memory controller 601 is configured to: divide the first subregion 604 into a plurality of data units; when mapping data in a data unit is changed, label the data unit; based on the number of the labeled data units in the first subregion 604, determine whether to trigger an update of mapping data in the second subregion 702 corresponding to the first subregion 604; and in response to determination of triggering the update of the mapping data in the second subregion 702 corresponding to the first subregion 604, send a message of recommending an update of the second subregion 702. The host controller 703 is configured to: receive the message of recommending the update of the second subregion 702, and determine whether to update the mapping data in the second subregion 702.

In some examples, the memory controller 601 is configured to: establish a bit map for the first subregion 604, with one bit in the bit map corresponding to one of the data units in the first subregion 604, so as to divide the first subregion 604 into the plurality of data units; and when a physical address corresponding to at least one logical address in the data unit is changed, label a bit corresponding to the data unit in the bit map, so as to label the data unit.

In some examples, the host controller 703 is further configured to: send a read command packet to the memory controller 601. The memory controller 601 is further configured to: receive the read command packet, and when the read command packet comprises the mapping data in the second subregion 702, acquire the number of the labeled data units in the first subregion 604 corresponding to the second subregion 702.

In some examples, the memory controller 601 is configured to: when the number of the labeled data units in the first subregion 604 is greater than or equal to an update threshold, determine to trigger the update of the mapping data in the second subregion 702 corresponding to the first subregion 604; and when the number of the labeled data units in the first subregion 604 is less than the update threshold, determine not to trigger the update of the mapping data in the second subregion 702 corresponding to the first subregion 604.

In some examples, the memory controller 601 is further configured to: in response to determination of updating the mapping data in the second subregion 702 by the host controller 703, send the mapping data stored in the first subregion 604 corresponding to the second subregion 702. The host controller 703 is further configured to: receive the mapping data stored in the first subregion 604, and update the mapping data in the second subregion 702 corresponding to the first subregion 604. Here, the update of the mapping data in the second subregion 702 may comprise replacing the mapping data in the second subregion 702 with the received mapping data stored in the first subregion 604. In this case, the mapping data stored in the first subregion 604 and the mapping data stored in the second subregion 702 corresponding to each other are consistent again, and the memory controller 601 may reset the respective bits in the bit map for the first subregion 604.

In the electronic apparatus provided by the examples of the present disclosure, the memory device of the memory system comprises the first subregions storing the mapping data, the host performance booster of the host comprises the second subregions storing the mapping data, the first subregion is in one-to-one correspondence with the second subregion, and the logical address ranges of the mapping data stored in the first subregion and the second subregion corresponding to each other are the same. The memory controller may divide the first subregion into the plurality of data units by establishing the bit map, label validity of the mapping data in the bit map in units of the data units, and determine whether to trigger the update of the mapping data in the second subregion corresponding to the first subregion based on the number of the labeled data units. On the one hand, the validity of the mapping data may be labeled in units of smaller granularity, thereby improving the accuracy of validity management. On the other hand, the update frequency of the second subregion may be regulated by setting the update threshold, thereby balancing the degree of occupation of system resources and the degree of impacts on the performance of the random read operation, so as to achieve the purpose of improving the overall performance of the system.

The present disclosure further provides a computer readable storage medium storing a computer program. In some examples, the computer program, when executed by a processor, may perform the operation method of a memory system in any of the above examples.

Here, all or part of the processes in the operation method of the above examples may be implemented by instructing relevant hardware through a computer program. The computer program may be stored in a computer-readable storage medium, and the execution of the computer program may comprise the processes of the operation method in any of the above examples. Here, the computer readable storage medium may be a diskette, an optical disk, a Read-Only Memory (ROM), a Random Access Memory (RAM), a Flash Memory, a Hard Disk Drive (HDD), or a solid state drive, etc., and the computer readable storage medium may further comprise a combination of the above various storage media.

The features disclosed in several device examples as provided by the present disclosure may be combined arbitrarily to obtain new device examples in case of no conflicts.

The methods disclosed in several method examples as provided by the present disclosure may be combined arbitrarily to obtain new method examples in case of no conflicts.

The above descriptions are merely example implementations of the present disclosure, and the protection scope of the present disclosure is not limited to these. Any variation or replacement that may be readily figured out by those skilled in the art within the technical scope disclosed by the present disclosure shall fall within the protection scope of the present disclosure. Therefore, the protection scope of the present disclosure shall be defined by the protection scope of the claims.

What is claimed is:

1. A memory system, comprising:

a memory device comprising a plurality of first subregions storing mapping data; and a memory controller coupled with the memory device and coupled with a host, wherein:

the host comprises a plurality of second subregions corresponding to the plurality of first subregions;

the mapping data comprises a logical address to physical address mapping relationship; and logical address ranges of mapping data stored in a first subregion and a second subregion corresponding to each other are the same; and wherein the memory controller is configured to:

establish a bit map for the first subregion with one bit in the bit map corresponding to one of a plurality of data units in the first subregion to divide the first subregion into the plurality of data units;

when a physical address corresponding to at least one logical address in a data unit is changed, label a bit corresponding to the data unit in the bit map as a dirty unit; and based on a number of the labeled data units in the first subregion according to corresponding bits of the bit map, compare the number of the labeled data units with an update threshold and determine whether to trigger an update of mapping data in the second subregion corresponding to the first subregion based on the comparison.

2. The memory system of claim 1, wherein the memory controller is configured to:

establish a bit map for the first subregion, with one bit in the bit map corresponding to one of the data units in the first subregion, so as to divide the first subregion into the plurality of data units; and when a physical address corresponding to at least one logical address in the data unit is changed, label a bit corresponding to the data unit in the bit map, so as to label the data unit.

3. The memory system of claim 1, wherein the memory controller is configured to:

when the number of the labeled data units in the first subregion is greater than or equal to an update threshold, determine to trigger the update of the mapping data in the second subregion corresponding to the first subregion; and when the number of the labeled data units in the first subregion is less than the update threshold, determine not to trigger the update of the mapping data in the second subregion corresponding to the first subregion.

4. The memory system of claim 1, wherein the memory controller is further configured to:

receive a read command packet;

when the read command packet comprises the mapping data in the second subregion, acquire the number of the labeled data units in the first subregion corresponding to the second subregion; and in response to determination of triggering the update of the mapping data in the second subregion corresponding to the first subregion, send a message of recommending an update of the second subregion.

5. The memory system of claim 4, wherein the memory controller is further configured to:

when a logical address of the mapping data in the read command packet falls within a logical address range of the mapping data stored in the labeled data units, acquire a physical address corresponding to the logical address from the first subregion and perform a read operation; and when the logical address of the mapping data in the read command packet falls outside the logical address range of the mapping data stored in the labeled data units, perform a read operation based on a physical address in the read command packet.

6. The memory system of claim 4, wherein the memory controller is further configured to:

in response to determination of updating the mapping data in the second subregion, send the mapping data stored in the first subregion corresponding to the second subregion.

7. The memory system of claim 3, wherein the number of the data units in the first subregion ranges from 8 to 1024, and a ratio of the update threshold to the number of the data units in the first subregion ranges from 25% to 75%.

8. An operation method of a memory system, comprising:

establish a bit map for a first subregion storing mapping data in a memory device of the memory system with one bit in the bit map corresponding to one of a plurality of data units in the first subregion to divide the first subregion into the plurality of data units;

when a physical address corresponding to at least one logical address in a data unit is changed, label a bit corresponding to the data unit in the bit map as a dirty unit, wherein the mapping data comprises a logical address to physical address mapping relationship; and based on the number of the labeled data units in the first subregion according to corresponding bits of the bit map, comparing the number of the labeled data units with an update threshold and determining whether to trigger an update of mapping data in a second subregion corresponding to the first subregion in a host based on the comparison, wherein logical address ranges of mapping data stored in the first subregion and the second subregion corresponding to each other are the same.

9. The operation method of the memory system of claim 8, wherein the dividing the first subregion storing the mapping data in the memory device into the plurality of data units and labeling the data unit comprises:

establishing a bit map for the first subregion, with one bit in the bit map corresponding to one of the data units in the first subregion, so as to divide the first subregion into the plurality of data units; and when a physical address corresponding to at least one logical address in the data unit is changed, labeling a bit corresponding to the data unit in the bit map, so as to label the data unit.

10. The operation method of the memory system of claim 8, wherein the determining whether to trigger the update of the mapping data in the second subregion corresponding to the first subregion in the host comprises:

when the number of the labeled data units in the first subregion is greater than or equal to an update threshold, determining to trigger the update of the mapping data in the second subregion corresponding to the first subregion; and when the number of the labeled data units in the first subregion is less than the update threshold, determining not to trigger the update of the mapping data in the second subregion corresponding to the first subregion.

11. The operation method of the memory system of claim 8, further comprising:

receiving a read command packet;

when the read command packet comprises the mapping data in the second subregion, acquiring the number of the labeled data units in the first subregion corresponding to the second subregion; and in response to determination of triggering the update of the mapping data in the second subregion corresponding to the first subregion, sending a message of recommending an update of the second subregion.

12. The operation method of the memory system of claim 11, further comprising:

when a logical address of the mapping data in the read command packet falls within a logical address range of the mapping data stored in the labeled data units, acquiring a physical address corresponding to the logical address from the first subregion and performing a read operation; and when the logical address of the mapping data in the read command packet falls outside the logical address range of the mapping data stored in the labeled data units, performing a read operation based on a physical address in the read command packet.

13. The operation method of the memory system of claim 11, further comprising:

in response to determination of updating the mapping data in the second subregion, sending the mapping data stored in the first subregion corresponding to the second subregion.

14. An electronic apparatus, comprising:

a memory system comprising a memory device and a memory controller coupled to the memory device; and a host coupled to the memory system, wherein:

the memory device comprises a plurality of first subregions storing mapping data;

the host comprises a host controller and a plurality of second subregions corresponding to the plurality of first subregions;

the mapping data comprises a logical address to physical address mapping relationship; and logical address ranges of mapping data stored in a first subregion and a second subregion corresponding to each other are the same; and wherein the memory controller is configured to:

establish a bit map for the first subregion with one bit in the bit map corresponding to one of a plurality of data units in the first subregion to divide the first subregion into the plurality of data units;

when a physical address corresponding to at least one logical address in a data unit is changed, label a bit corresponding to the data unit in the bit map as a dirty unit;

based on a number of the labeled data units in the first subregion according to corresponding bits of the bit map, compare the number of the labeled data units with an update threshold and determine whether to trigger an update of mapping data in the second subregion corresponding to the first subregion based on the comparison; and in response to determination of triggering the update of the mapping data in the second subregion corresponding to the first subregion, send a message of recommending an update of the second subregion; and wherein the host controller is configured to:

receive the message of recommending the update of the second subregion; and determine whether to update the mapping data in the second subregion.

15. The electronic apparatus of claim 14, wherein the memory controller is configured to:

establish a bit map for the first subregion, with one bit in the bit map corresponding to one of the data units in the first subregion, so as to divide the first subregion into the plurality of data units; and when a physical address corresponding to at least one logical address in the data unit is changed, label a bit corresponding to the data unit in the bit map, so as to label the data unit.

16. The electronic apparatus of claim 14, wherein the memory controller is configured to:

when the number of the labeled data units in the first subregion is greater than or equal to an update threshold, determine to trigger the update of the mapping data in the second subregion corresponding to the first subregion; and when the number of the labeled data units in the first subregion is less than the update threshold, determine not to trigger the update of the mapping data in the second subregion corresponding to the first subregion.

17. The electronic apparatus of claim 14, wherein the host controller is further configured to:

send a read command packet to the memory controller; and the memory controller is further configured to:

receive the read command packet, and when the read command packet comprises the mapping data in the second subregion, acquire the number of the labeled data units in the first subregion corresponding to the second subregion.

18. The electronic apparatus of claim 14, wherein the memory controller is further configured to:

in response to determination of updating the mapping data in the second subregion by the host controller, send the mapping data stored in the first subregion corresponding to the second subregion;

the host controller is further configured to:

receive the mapping data stored in the first subregion, and update the mapping data in the second subregion corresponding to the first subregion.

* * * * *